United States Patent [19]

Kobus, Jr.

[11] Patent Number: 4,864,494
[45] Date of Patent: Sep. 5, 1989

[54] SOFTWARE USAGE AUTHORIZATION SYSTEM WITH KEY FOR DECRYPTING/RE-ENCRYPTING/RE-TRANSMITTING MOVING TARGET SECURITY CODES FROM PROTECTED SOFTWARE

[75] Inventor: Paul Kobus, Jr., Phoenix, Ariz.

[73] Assignee: Computerized Data Ssytems for Mfg., Inc., Phoenix, Ariz.

[21] Appl. No.: 842,552

[22] Filed: Mar. 21, 1986

[51] Int. Cl.[4] .................. H04L 9/00; H04K 9/00; G06F 12/14

[52] U.S. Cl. .................. 364/200; 380/4; 380/25; 364/246.6; 340/125.31

[58] Field of Search ... 364/200 MS File, 900 MS File; 380/3, 4, 25, 29; 340/825.31, 825.34

[56] References Cited

U.S. PATENT DOCUMENTS

| | | | |
|---|---|---|---|
| 3,806,882 | 4/1974 | Clarke | 340/172.5 |
| 3,976,840 | 8/1976 | Cleveland | 179/2 |
| 4,120,030 | 10/1978 | Johnstone | 364/200 |
| 4,168,396 | 9/1979 | Best | 178/22 |
| 4,262,329 | 4/1981 | Bright | 364/200 |
| 4,278,837 | 7/1981 | Best | 178/22.09 |
| 4,430,728 | 2/1984 | Beitel | 364/900 |
| 4,433,207 | 2/1984 | Best | 380/4 |
| 4,458,315 | 7/1984 | Uchenick | 364/200 |
| 4,465,901 | 8/1984 | Best | 380/4 |
| 4,471,163 | 9/1984 | Donald | 178/22.08 |
| 4,523,271 | 6/1985 | Levien | 364/200 |
| 4,525,599 | 6/1985 | Curran et al. | 380/29 |
| 4,558,176 | 12/1985 | Arnold et al. | 380/4 |
| 4,588,991 | 5/1986 | Atalla | 380/4 |
| 4,590,470 | 5/1986 | Koenig | 340/825.31 |
| 4,634,808 | 1/1987 | Moerder | 380/29 |
| 4,652,900 | 3/1987 | Pailen | 364/200 |
| 4,683,968 | 8/1987 | Appelbaum et al. | 380/4 |

OTHER PUBLICATIONS

Lennon, R. et al., "Application for Personal Key Crypto with Insecure Terminals", IBM Tech. Dis. Bulletin, vol. 24, No. 18, Jun. 1981, pp. 561-565.

Primary Examiner—Archie E. Williams, Jr.
Assistant Examiner—Ayni Mohamed
Attorney, Agent, or Firm—LaValle D. Ptak

[57] ABSTRACT

A computer based function control system is particularly suited for use as a software security device on the highly popular personal computers or a micro-processor driven function. The system includes an encrypted security message uniquely encoded at predetermined locations within the software or function program. The software or function program includes pre-set errors in it to cause failure of execution of the function or software program unless the errors are nulled during operation of the function or software program. A separate electronic key for retrieving, recognizing, decrypting, encrypting, and producing the null signals is connected to the communications port of the computer from which the key draws its power as well as the security message passed from the computer to the key and back to the computer. There is interchange of moving target and validation information between the computer software and the electronic key. This information is transferred via the security message under the cover of encryption and is monitored by the key and the software to insure that operation of the program can be effected only by authorized users of the function or software program (that is those having the key uniquely associated with that program).

19 Claims, 4 Drawing Sheets

SOFTWARE USAGE AUTHORIZATION SYSTEM WITH KEY FOR DECRYPTING/RE-ENCRYPTING/RE-TRANSMITTING MOVING TARGET SECURITY CODES FROM PROTECTED SOFTWARE

BACKGROUND

The advent of micro-processors has revolutionized the computer industry. Dedicated computers now are used in a variety of security and control functions such as automobiles, keyless hotel entry systems, cable television, et cetera. In addition, such microprocessors have resulted in the widespread use of powerful, relatively small-sized personal computers capable of running wide varieties of programs. As such computers, particularly personal computers, become more widely used, the development of software programs to extend the application of such computers into every aspect of business, professional, commercial and home uses is expanding in an explosive manner. Each new generation of software programs for use with such computers seems to become more complex in an effort to simplify the utilization of the programs by the computer users (user friendliness). The complexity of programs, in most cases, is inversely proportional to the ease of use. As software vendors attempt to extend the use of their programs to a wider range of potential computer users, the time, effort, and expense required to produce such programs becomes very significant.

In an effort to recover the developmental costs of modern software programs, particularly those tailored for use with personal computers, the selling prices of such programs are relatively high. As a consequence, there is a strong temptation on the part of many users to produce extra copies for friends or, in the case of program pirates, to produce extra copies for sale at highly discounted prices for use by persons who do not buy from the original vendor and/or developer of the programs. It is believed that the number of unauthorized copies, in many cases, equals or approaches the number of authorized copies of software programs.

In an effort to curb unauthorized production of programs, software vendors have attempted a variety of deterrents. Where the software is sold as a separately priced package, the package frequently includes a statement that utilization of the software by the purchaser includes a contract wherein the purchaser/user agrees not to produce additional copies (other than authorized back-up copies) of the program. The enforceability of such a contract is difficult, and little actual enforcement to date has been evidenced.

Many programs are "copy-protected", i.e., they include a code which prevents operation of the program from a copy made of the original. Persons with even a minimal knowledge, however, of the computer operation readily can bypass this "copy protection" feature and thereafter produce unlimited numbers of copies which will operate. Such persons are called computer "hackers" in the industry and large numbers of unauthorized copies of valuable programs have been set loose in the marketplace by such hackers. Individual and company "hackers for hire" even sell special programs designed to break copy-protected programs for the purpose of assisting in the making and dissemination of unauthorized copies. Usually such copies are made for friends and close associates, but even one unauthorized copy for every authorized sale represents significant losses in sales by the original software vendor.

Some programs are bundled together with specific hardware and are sold as a unit. This is not practical, however, because many software packages are sold separately to the general public for use in personal computers to permit such computers to be used for applications which can vary widely from one purchaser of such a computer to another.

Efforts also have been made in the past to encrypt the programs in some manner and then provide a separate decryption for implementation within the computer, so that the software could not be run on any computer which did not have the authorized decrypting circuitry in it.

A system for providing a cryptographic decoder for computer programs for restricting use of a program only to customers who have paid for such use is disclosed in the patent to Best U.S. Pat. No. 4,433,207. The system of Best requires a deciphering key in the form of a decoder chip which must be incorporated into the computer itself. The programs themselves are encoded and in addition, some third person must provide a program "patch" which will permit operation of the program with the computer equipped with the decoder chip. Because the computer requires the installation of the circuit ship connected to the data bus, and further since it is necessary to "patch" the key and program, the system is relatively cumbersome. In addition, it is possible to decipher the working programs by tapping the data bus in the microprocessor unless an entirely new microprocessor board with the key as an integral part of it is supplied. Thus, the encryption system may be relatively easily broken by knowledgeable persons. Except for these disadvantages, the system of Best does function to prevent use of the program by unauthorized users (who have not broken the enciphering key) by introducing random errors into the legitimate program which will cause unpredictable malfunctions of the program execution in an unauthorized computer. The authorized computer operated with a properly installed and "patched" key chip neutralizes these errors so that proper program operation takes place.

Another system for preventing unauthorized use of computer programs is disclosed in the patent to Uchenick U.S. Pat. No. 4,458,315. This patent stores a first key information in the program which is to be protected; and a separate key circuit, physically separate from the program, is provided to the customer with each program which is sold. This separate key stores second key information which is to be utilized in conjunction with the first key information for comparison in the computer to permit operation of the program in the computer if a predetermined relationship between the keys exist. If such relationship does not exist, the processing of the program is terminated. As in the case of the system of Best, however, it is possible to examine the data bus and capture the deciphered code embodied in the keys; so that copied decoded programs then can be produced by unauthorized copiers for use without the key. The requirement for implementation of the key inside the central processing unit or the computer itself also is undesirable.

Three other computer software security systems which require the addition of a decoding chip to be placed inside the central processing unit or computer itself are disclosed in the patents to Best U.S. Pat. Nos. 4,168,396; Best 4,278,837; and Johnstone 4,120,030.

Each of these systems require the installation of an internal chip in the computer with all of the disadvantages which have been discussed above in conjunction with the Best patent U.S. Pat. No. 4,433,207. In addition, Best '396 and Best '837 each require a battery to preserve the enciphering key in the chip. Each chip references differently enciphered programs and program "patches" require specifically encrypted programs to be used. In all three of these patents, a deciphered working program may be captured by tapping the data bus in the microprocessor unless the decoding chip is incorporated into an entirely new microprocessor board supplied for unique operation with that program. Such an approach is unacceptable for any computer which is to be utilized in the operation of multiple programs, since each such program would require a separate microprocessor board for optimum security.

Another prior art approach employing a separate program decoding key for use with an encrypted program is disclosed in the patent to Clarke U.S. Pat. No. 3,806,882. This patent utilizes a RAM for security storage. Consequently, power must be supplied at all times to maintain viablity of the security. The electronic key which is utilized is a ROM which requires a considerable amount of time to erase and encode. In operation, the address of the key is erased and rewritten periodically (such as once every 48 hours) and this must occur continuously in order for a user to maintain access to the security storage. Consequently, it is necessary to have a back-up power supply for use with the system, since the key and that portion of the computer which interfaces with it continuously must be active in order to provide the desired level of security. Most personal computers are turned off and on frequently during their operation (at least once a day). Many personal computers are portable and most of the personal computers which are presently available in the market do not have a back-up battery supply for continuously supplying power to portions of the computer circuitry. Thus, the system of Clarke is not practical for such personal computers.

It is desirable to provide a simple and effective computer software protection system which overcomes the disadvantages of the prior art mentioned above. It further is desirable to provide a computer software security system which utilizes inexpensive circuitry, requires no permanent power supply, and operates in conjunction with codes embedded in the software itself to provide authorized use of a program only by a user having a key corresponding to the particular software package with which such key is uniquely associated. Copies of the software should not be capable of being run with any other key or without a key, and the embedded code should be made as nearly incapable of breaking (reverse engineering) as possible.

SUMMARY OF THE INVENTION

It is an object of this invention to provide an improved computer security system.

It is another object of this invention to provide an improved computer security system which is inexpensive and simple to implement.

It is an additional object of this invention to provide an improved computer security system employing a decoding key for use with a uniquely encoded software program.

It is a further object of this invention to provide a computer security system using a portable decoding key encoded for operation with a particular uniquely encoded software package and capable of operation with different individual computers and different makes of computers.

It is yet another object of this invention to provide a computer system employing a decryption key for use with an encrypted message exchange between the computer and an electronically secure key in which the key is attached to the communications port of the computer for permitting operation of the computer with protected software only when an authorized key is so connected.

In accordance with a preferred embodiment of this invention a system for insuring operation of a computer software program by only an authorized user includes a separate security key which has an encryption and decryption circuit encoded in it for encrypting and decrypting an encrypted security message inserted into the software program. The key is connected to a computer operating the software to permit transfer of data signals from the computer to the key and back from the key to the computer. Circuitry is provided in the key for recognizing predetermined ones of security message portions in the software program and in response to such recognition for modifying such portions and for supplying the modified portions from the key back to the computer whereupon the computer generates new predetermined encrypted security message portions for storage in the software as replacements for the original security message portions. These replacement portions then are subsequently utilized in ongoing operation of the software to generate further replacements on a continuous basis. At random intervals, or quasi-random intervals determined by the key, comparisons are made of the security message portions which are stored in the software with the message portions supplied to the key. If the comparison is valid, the computer program is permitted to continue to operate error free. If the comparison is invalid, the program with unnulled pre-set errors in it is executed to cause failure of operation.

In a more specific embodiment of the invention the key is connected to the communications port of the computer for receiving operating power from the communications port and for transferring data from and to the computer.

DESCRIPTION OF THE PREFERRED EMBODIMENT

Before entering into a discussion of the preferred embodiment shown in the drawings, some definitions of terms used in the following description are considered to be in order. Reference is made to a device called and "electronic key". Such an "electronic key" is an electronic device (preferably a chip based micro-processor with ROM memory) designed to provide, via an encrypted message exchange with a general purpose or function control computer, the following information: (1) device presence; (2) unique device authenticity; and (3) optionally, monitor and communicate, via the security message, information gathered via transducers or digital means. The electronic key is electronically secure in that investigation by the outside world of the ROM encoded program and data variables is not possible.

Also as used in the following description the term "function" as used in the above definition of "electronic device" includes, but is not limited to, (1) power or fuel supply; (2) computer software calculation output; (3) cable television services; and (4) hotel room access.

The system described in this application is designed to control the operation of a computer in an uncontrolled environment such that that computer is not operating in the presence of the function author or under his control, either directly or by means of a communications modem, but in an environment where the author presence and control is desired. The system of the preferred embodiment of the invention achieves author, presence, and control in an uncontrolled environment by means of unique fingerprints which are developed at software or computer shipment time under control of the function author. This is done in the form of a combination of author supplied and randomly computer calculated information which is subsequently stored and used to encrypt, decrypt, and calculate security information within the confines of an electronically secure microprocessor chip (function control computer or key), such that only the function author using a combination of his originally supplied and randomly computer calculated information is capable of breading security, once the fingerprints are induced in the computer and key. A unique security fingerprint set (computer and key(s)) may, depending upon the need for replacement of either or both, be duplicated in a new blank computer of key(s) by way of encrypted instructions from a computer under control of the function author. Obviously, the latter process also could be used to effect a change in the security variables and/or cipher keys if this is desirable.

Figure 1:
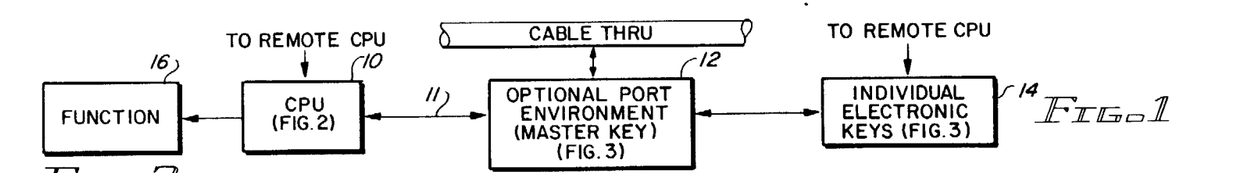
FIG. 1 is a block diagram of the key/computer interface of a preferred embodiment of the invention.

Reference now should be made to the drawings which are used to illustrate a preferred embodiment of the invention. FIG. 1 is a block diagram of the manner of application of the hardware portion of this invention to a standard computer (CPU) 10, which typically is in the form of a personal computer. Such personal computers have communications ports for interconnection with other peripheral equipment, such as printers and the like. A communications port which is nearly universal on all personal computers manufactured in the United States, irrespective of make, is known as the RS-232 Port. Applicant has found that this port (11 in FIG. 1) is capable of supplying operating power as well as functioning to pass signals to and from the computer 10. To provide software security without modifying the computer 10 and without requiring any internal connections to the computer 10, an optional port environment or master key (interface) 12 and an individual electronic key 14 are connected in cascade to one another and to the RS-232 Port 11. The master key 12 also includes a cable passing through it for interconnection of the conventional peripheral equipment normally connected to this port, so that the addition of the key 12 and individual electronic key 14 to the RS-232 Port 11 connection does not interfere with the normal operation of the computer.

The computer 10 then is used to control a desired function 16, which may take a variety of different forms. For example, function 16 may be the power control for the fuel supply of an automobile, computer software results, numerically controlled tools (such as die cutters), keyless hotel room access, cable television, and other functions. The computer 10 may be either software programmed or operating under a fixed ROM program. The operation of the computer is essentially that of a delivery device involving interaction between the computer and the function 16 in order to deliver correct results from the computer 10 to the function 16. This interaction of the computer 10 with the function 16 is controlled by properly processed messages (digital and analog) traveling between the computer 10 and the interfaces to function 16.

The master key 12 of the optional port environment is required if the computer 10 is a general purpose computer which is being used for functions other than a pre-established, dedicated function. For most applications of personal computers, the port environment or master key 12 is necessary. For situations, however, where the computer is ROM programmed this master key 12 may not be necessary. The interface with the communications port 11 of the computer is the same whether the master key 12 is used or not. In the event that a ROM controlled computer 10 is employed in the system, the individual electronic keys 14 are connected directly to the communications port 11 rather than in cascade as shown in FIG. 1.

The individual electronic keys 14 interact with the computer 10 by way of an encrypted interface message or messages, software, and optional digital or analog process control sensors (primarily for ROM computer environments) for additional control from function 16. Multiple interfaces permit multiple control points to be analyzed by the computer 10 as described in conjunction with the remaining figures of the drawings.

The actual sizes of the master key 12 and individual electronic key 14 are quite small. The master key and individual electronic keys both may be packaged in "thumb-sized" configurations. Since an individual key 14 is required for each different software package to be protected, the master key 12 typically is configured to accommodate a plurality of individual electronic keys 14 connected in parallel (actually plugged into a bus connected to the master key 12) to receive signals from a single master key 12. Only a single individual key 14, which is associated with the program being run, actually responds to those signals at any given time. Similarly, the housing for the master key 12 also includes the pass-through for the cable 15 to the other peripheral equipment. A master key 12 capable of accommodating an individual electroninc key 14 and the cable pass-through typically occupies a space of approximately 4"×6"×1-½". Each of the individual electronic keys 14 then constitutes a plug-in module approximately 1"×½" in diameter. A multiple individual key bus device connected by cable to a jack located in the cable-pass-through accommodates multiple individual key situations.

As indicated in conjunction with FIG. 1, an important factor in the use of this system with a standard personal computer 10 is the fact that the security message exchange between the CPU 10 and the electronic key 14 is encrypted for a high level of security. The information appearing on the line connected to the RS-232 Port 11, and therefore on the computer databuses themselves, is encrypted information. It is not possible to tap into the data buses and decode the security message because it is never found decrypted except when calculated during execution of the object phase of security checking (FIG. 3) or within the electronic key 14. Furthermore, it should be noted that any attempt to capture the object code at a time of execution by tapping the CPU data buses results in capturing the error-nulled instructions as well as the necessary routines to invoke security checking in the copied program.

Figure 2:
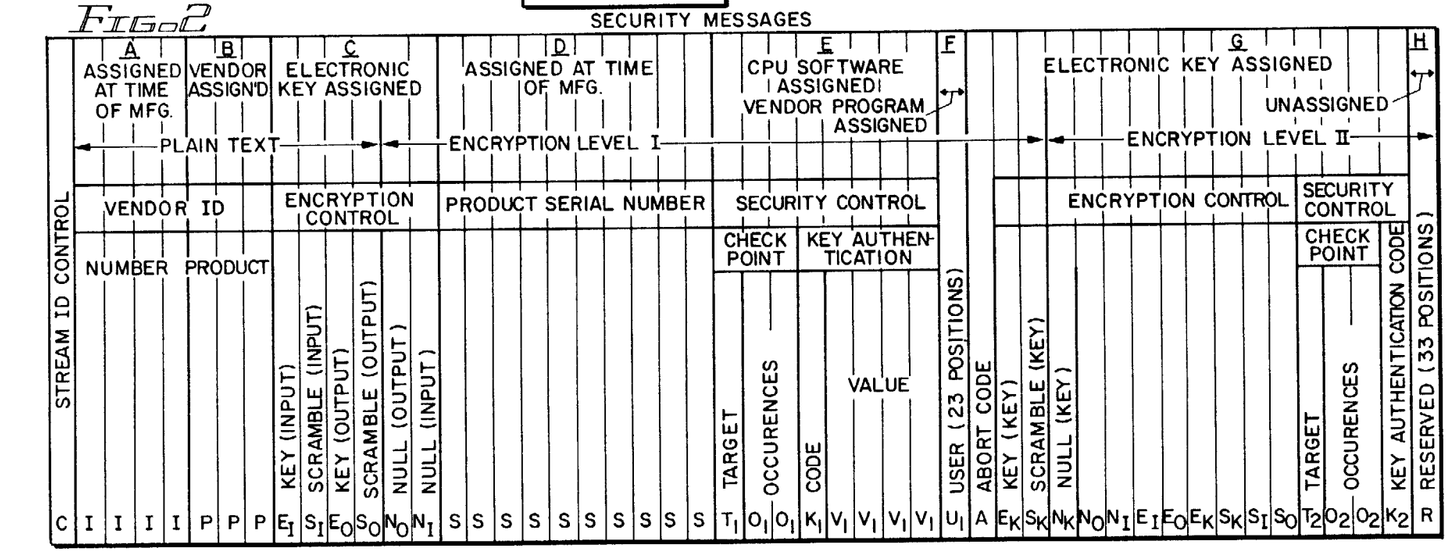
FIG. 2 is a detailed representation of the unencrypted security message context.

To better understand the nature of the software security control and the corresponding hardware and operation of the master key 12 and individual electronic key 14, security message which is incorporated into the software is shown in FIG. 2. Selected parts forming the unique electronic key address i.e. vendor I.D. and product serial number are ROM encoded into the electronic key 14 at the time of manufacture. During a process called "personalization", the software vendor develops his own null, transposition and cipher keys as well as variables used in the security algorithms. During software copy preparation, the software vendor, through a combination of "personalization" data, addressed but otherwise blank keys, and security vendor supplied hardware and software, provides (1) "personalization" to the electronic key 14; and (2) an initial encrypted security message containing the electronic key address. The software copy is sold with a security message and a similarly unique ROM encoded individual electronic key 14 which then must be used with the computer 10, interconnected in the manner shown in FIG. 1, in order to properly operate that software package set. The security message which is stored on the software disc (where the software is sold separately from the computer) is always stored in encrypted form for Levels I & II and Level I is decrypted only in the security check object code processing in the computer. The software disc operates via the Level II encryption portion of the security message as RAM memory for the powerless, electronics in the individual security key 14. Copies of the software which are run without its unique key 14 or which are attempted to be run without a key will not function, for reasons explained subsequently.

The security message illustrated in FIG. 2 consists of eight groups of characters A, B, C, D, E, F, G, and H, which, in turn, are subdivided into three primary groups indicated in FIG. 2 as "Plain Text","Encryption Level I", and "Encryption Level II". The data which comprises the security message is sequentially arranged, as illustrated in FIG. 2, from left to right with the data in the positions on the left being transmitted first from the software through the CPU 10 and the communications port 11 to the master key 12 and from that key to the individual electronic keys 14. This data commences with a one position field (character) which is used to determine if any message or oncoming stream is or is not a security message. This is a single character encoded at position "C" shown in FIG. 2 on the extreme left side. Typically this character is an ASCII character of low occurrence such as the "delete" symbol (DEL). This character is used simply to alert the master key 12 that a security message is to follow. If subsequent portions of a security message then do not occur, and this low occurrence character is determined as a result not to be associated with a security message, the message following this character is simply routed back onto the RS-232 Port 11 through the master key 12 for operation in a conventional manner suffering only a one character delay. If, however, this character does signal the presence of a security message, the rest of the security message which follows is identified and processed by the keys 12 and 14.

The next portion of the security message is shown at Group A and is assigned at the time of manufacture of the key 14 by the security vendor. This portion comprises a software vendor identification number comprises of the four positions (character) identified by the letter "I". The next three positions (Group B) constitute a software vendor identification product number which is encoded by the software vendor in the electronic key 14 at the time of "personalization" of that key to uniquely identify it with the specific software package with which it is associated. "Personalization" of the key causes that particular key 14 to be encoded differently through the product serial number and vendor ID number and product identification to distinguish it from all other keys, including those sold with different copies of the same software package. As is explained more fully in conjunction with FIG. 3, the manner in which the entire security checking is embedded in or located in the program also is selected by the software vendor and is done in a manner which makes it impossible for the security vendor to breach the security of any given software package and electronic key set. The "personalization" of the electronic key 14 occurs only once or when the function control interfaces of the system shown in FIG. 1 are replaced or in some cases periodically monitored. To accomplish this, the "personalization" information to be stored in the individual electronic key 14 is supplied from a remote CPU through the CPU 10 or from a remote CPU directly to the electronic keys 14 as indicated in FIG. 1. Once the "personalization" process has been terminated, the communications link to such remote CPU is removed.

The next Group "C", is identified as the Encryption Control Group and the first four positions constitute unique position codes in the "plain text" portion of the security message. Each of these codes select one out of ten possible keys assigned by the software vendor and encoded in the electronic key 14 at the time of its "personalization" uniquely identifying it with a specific software package. The first of these keys constitutes an encryption key $E_I$ which is used in the encryption algorithm for input to the central processing computer 10. The second is a one position code $S_I$ to determine which of ten transposition cipher keys, assigned by the software vendor and encoded in the electronic key at the time of "personalization", is to be used in the transposition algorithm for input to the computer 10. The third of these codes $E_O$ is another one of ten possible encryption keys which is assigned by the software vendor and encoded in the electronic key at the time of "personalization" and is used in the encryption algorithm for output from the CPU. The fourth position is a code $S_O$ to determine which of ten transposition cipher keys, assigned by the software vendor and encoded in the electronic key at the time of "personalization" is to be used in the transposition algorithm for output from the CPU or computer 10.

The next two positions in Group "C" constitute the null output $N_I$ and null input $N_O$. Each of these are a one position code also assigned by the software vendor and encoded in the electronic key at the time of its "personalization". The null input code $N_I$ is used to determine which of ten possible null mask keys is used in the null mask algorithm for input to the computer 10. Similarly, the null output code $N_O$ is a one position code which determines which of ten null mask keys, assigned by the software vendor and encoded in the electronic key 14 at the time of "personalization" is to be used in the null mask algorithm for output from the computer 10. The information in Group C is encrypted information and always appears in encrypted form. The invention is capable of operation with various types of encryption techniques. It has been found that utilization of polyalphabetic encryption with key length equal to the "plain text" of Level I or Level II coupled with preprocessing of the "plain text" by the insertion of null characters and a transposition cipher provide a high level of security for the system.

Each software set or package which is sold by the software vendor is identified by a unique serial number. This is commonly done in the market today, so that no two software packages have the same serial number. In the present system, however, the product serial number is encrypted as part of the security message and comprises the next ten positions Group "D", with the serial number positions identified by the letters "S". This security number is preferably assigned by the security vendor (not the software vendor) or key 14 manufacturer and is encoded in the electronic key 14 at the time of the manufacture of the key itself.

The next group in Encryption Level I of the security message comprises Group "E" which is the security control portion of the message; and this is assigned by the software vendor at the time of "personalization" of the key 14 to uniquely identify it with the particular software package with which it is associated. This security control portion comprises two main parts identified as "check point" and "key authentication". The check point comprises a target "$T_1$", which typically is one of ten possible security check points targeted for activation and encoded in the electronic key at the time of "personalization". This "target" constitutes a specifically identified program or program portion in the software system and occurs each time that program is run or that portion of the program is run by the computer 10. In any software system, there are a number of different programs which are run in conjunction with the operation of the system; and this target simply constitutes an encrypted selection of one of those programs. Ideally, the selected program should be one which is operated frequently during the operation of the system in order to optimize the security protection features of the invention.

The next two characters in the check point portion of the security control section of the security message are the positions identified by the letter $O_1$. These characters are generated by a counter in the object code phases of FIG. 3 as a count of the number of times the security check has been executed at the target check point $T_1$ by the central processing unit or computer 10.

The next portion of the security control section comprises the key authentication and commences with a one position code character "$K_1$" utilized to determine one of ten variables (each with a range from 1,000–9,999) and a corresponding mask. This character is assigned by the software vendor and is encoded in the electronic key 14 at the time of its "personalization" by the software vendor. This code $K_1$ is used in an algorithm to determine the authenticity of the electronic key 14 used with the specific software package being operated by the computer 10. The code $K_1$ is followed by a four position value code $V_1$ also used in the algorithm to determine the authenticity of the electronic key 14. This value code initally is "personalized" in the software and in the electronic key at the software vendor's facilities and, as is explained later, is varied at quasi-random times to provide an additional level of security for the system.

The next Group "F" is illustrated as a twenty-three position field ($U_1$) which may be used by the software vendor for various purposes.

Next in Encryption Level I, is an abort code "A" which is encoded into the electronic key 14 by the security vendor. This abort code is used to alert the central processing unit 10 that a security violation has been determined by the individual electronic key 14. The manner in which this signal is utilized by the system is determined by the software vendor, but most frequently the abort signal is employed to permit erroneous operation of the software by the CPU 10 preceded by a warning display on the CRT of the computer 10. This abort signal also is generated by the CPU 10 directly in the event that attempts are made to operate the software with a look alike key or to operate the software without any electronic key 14 connected to the computer 10.

The next two positions $E_K$ and $S_K$ are encoded in the electronic key by the software vendor at the time of "personalization" and are used with the encryption and transposition algorithms, respectively, during the electronic key processing (Encryption Level II). Each of these positions are used to select one of ten possible encryption keys and transposition cipher keys provided at "personalization" by the software vendor for this purpose.

The final portion of the message is in Group "G" and is identified as Encryption Level II. All of the positions which are indicated in this level are assigned by the software vendor and are encoded in the key at the time of "personalization". The first character $N_K$ is used in the null mask algorithm. The remainder $N_O$, $N_I$, $E_I$, $E_O$, $E_K$, $S_K$, $S_I$, and $S_O$, are the same as are found in the corresponding values in Encryption Level I and in the "plain text" portions, respectively, of the security message.

The next part of the message is identified as "security control" comprising three positions identified as "check point", which correspond to the similar positions in Encryption Level I. The target $T_2$ is the same as $T_1$ found in Encryption Level I. Occurrences $O_2$ comprise a two position value for the count calculated by the electronic key 14 and used in the security algorithm for monitoring check point continuity of the software as processed by the CPU 10 and as monitored by the electronic key 14. The key authentication code $K_2$ comprises the next position and is the same as the corresponding code $K_1$ of Encryption Level I. At the far right of the security message of FIG. 2 is shown a reserved 33 position R which will be utilized by the security vendor for any desired purpose or for passing monitoring information to the computer function program. It is one of the intents of the Level II encryption portion of the message to serve as RAM storage for the electronic key, as mentioned previously. The Level II encryption acts as an envelope in an envelope (Level I) and is opened and processed only within the electronically secure confines of the electronic key 14.

Figure 3A:
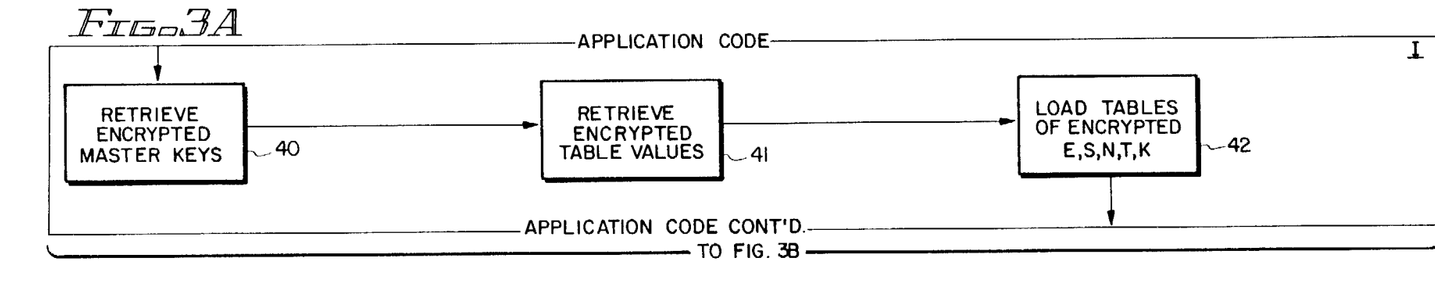
FIGS. 3A and 3B are flow charts of the computer security message encoding process, further illustrating check point phases inserted at quasi-random points in the operating program.
Figure 3B:
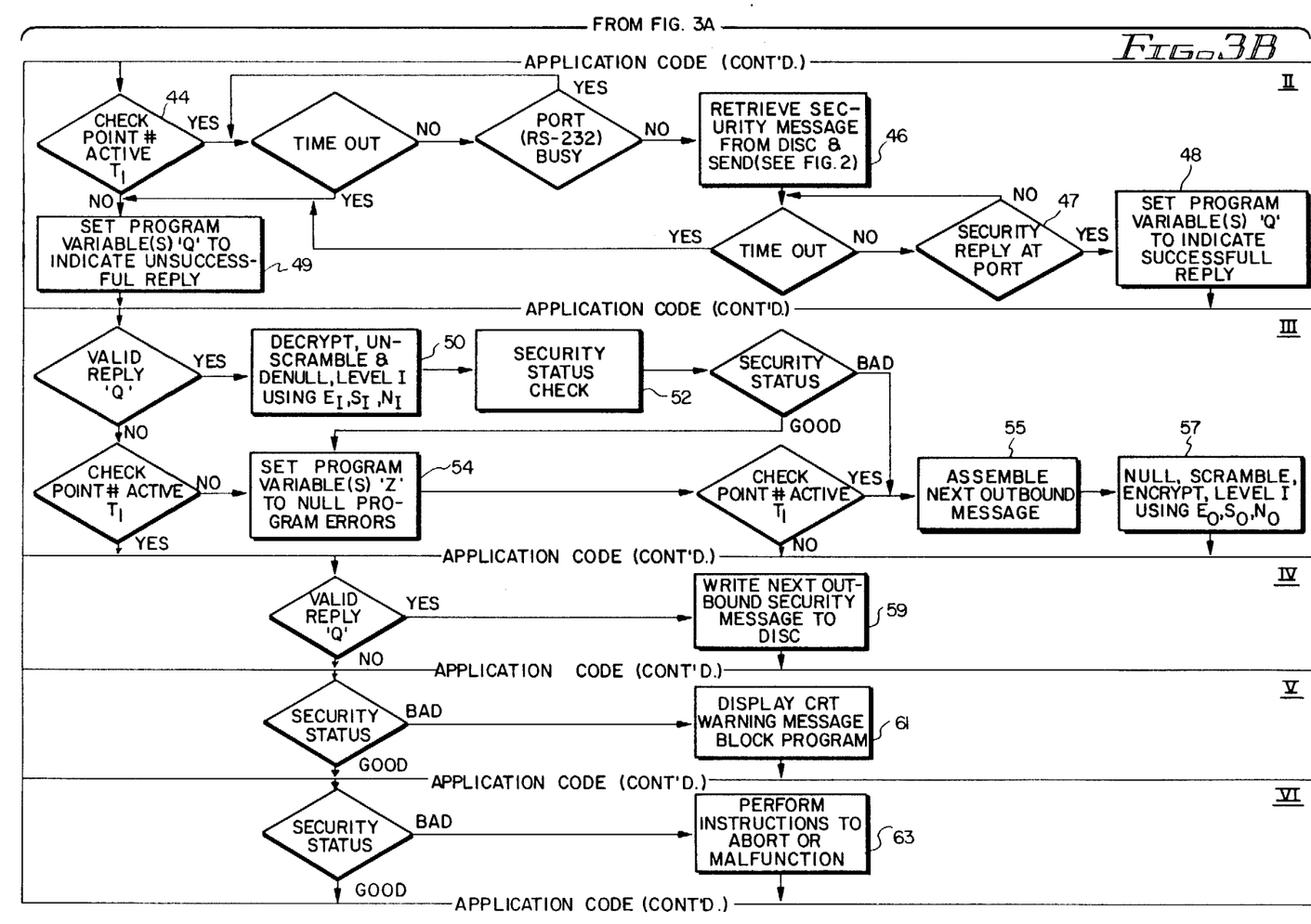

The processing of the security message of FIG. 2 uniquely is incorporated into the software object program itself FIG. 3 and, as indicated in the description of FIG. 2, is encoded into the individual electronic key 14 which is associated with that software and which is used to "unlock" the operation of that software by any CPU 10 capable of running the software. The manner in which this security message is incorporated into the software and, in conjunction with the software, is incorporated into the individual electronic key 14 used to permit operation of that software in a computer 10 now will be explained.

It is necessary to provide information in the software and in the key which may be compared, one with the other, to "unlock" the software for error free operation by the computer 10. This inter-relating of the software and the encoded information in the individual key 14 is best understood by reference to FIG. 3. Prior to merging the security vendor source code, with the specific application or software vendor source code the software vendor selects a maximum of ten error free application programs for inclusion of the security check point phases. The selected programs, within the software system, may be randomly chosen for the purpose of determining the strategic placement of the six security check point phases (I through V) illustrated in FIG. 3.

The software vendor then executes a program supplied by the security vendor which generates source code representing the master encipher key generating routine (program). The resultant source code is then included into the application code as required and provides the generation of a unique software package master cipher key on demand by the application code such that the key is never stored but derived by the object code as required for enciphering and deciphering code table entries and the security message. It should be noted that a combination of software vendor input plus randomly computer generated values are combined to generate the encipher key generating source code such that the resultant object code generated cipher key value is known to no individual.

In addition, the software vendor developes error source code for inclusion into the final compiled program. This error code intentionally introduces errors into the program when it is executed to cause erroneous operating results unless valid security checking has nulled the error code. The various phases which are identified by Roman Numerals I through VI in FIG. 3 are interspersed randomly throughout the application code for the check-pointed software programs. They constitute brief interruptions in the otherwise continuous sequential operation of the software application code. By interspersing the security information in six randomly located positions in the application code, reverse engineering of the object code by a potential intruder or unauthorized user of the program will require detailed analysis and modification of all phases, including the finding of the not-so-obvious error code Phase VI which has been placed into the program by a software author. In addition, unless the intruder knows what programs are security checkpointed; and also knows all of the programs which contain error code, he must reverse engineer all object programs of the entire software package.

Next, the software vendor compiles into object code the merged source code creating an object executable code. This object executable code then is copied to the disc of the personalization hardware which consist of a personal computer capable of writing magnetic media output (such as magnetic disc) and a specially designed key reader-writer device attached to the computer through the RS-232 Port.

The "personalization" software which is supplied by the security vendor (the supplier of the key 14) is executed causing the following elements of the personalization data to be solicited via the CRT and keyboard:

1. Produce Identification ("P" of FIG. 2)

2. Encryption Key Tables - 3 Sets ($E_I$, $E_O$, and $E_K$) each indexing one of ten polyalphabetic encryption key values each comprising 58 characters (the same length as the nulled and transposed "plain text" of Encryption Level I or Encryption Level II).

3. Transposition Key Tables - 3 Sets ($S_I$, $S_O$, and $S_K$) each indexing one of ten transposition key values each comprising three positions. The first position represents a shift within a seven position field and the second and third positions represent shift within a 56 position field. For example, the 56 position field is made up from 56 of the 58 characters of each of the nulled encryption levels. The eight seven-position fields are made up by taking seven contiguous characters starting in positions 1, 8, 15, 22, 29, 36, 43, and 50, of the 56 position field. During detransposition, the inverse function of this transposition code is performed.

4. Null Code Tables - 3 Sets ($N_I$, $N_O$, and $N_K$) each indexing one of ten null mask values each comprised of a 58 position mask made up of 46 blank positions interspersed with 12 nonrecurring alphanumeric characters, such that when these are combined with either Encryption Level I or II "plain text" data, any blank position will be replaced by a Level I or II "plain text" character. The inverse function is performed during denulling.

5. Security Check Point Target Tables - $T_1$ or $T_2$ indexing 1 of 10 check point target values each of which is comprised of the following:
  (a) a two position numeric value representing a starting value for tracking occurrences and stored only in individual electronic key 14; and a two position numeric value representing the ending value for tracking occurrences and stored only in individual electronic key 14; and
  (c) a two position target location (1 of 10 security check programs).

6. Key Authentication Code Table - $K_1$ or $K_2$ indexing one of ten key authentication values each comprised of the following:
  (a) a four position numeric value with a range of numbers 1,000 to 9,999; and
  (b) an eight position mask made up of four blank positions interspersed with four nonrecurring alphanumeric characters, such that when used with an eight digit numeric value, a four digit numeric value can be deduced by eliminating those digits whose relative position in the mask are blank.

7. Abort code - Invalid code test; invalid check point test; and valid test result.

8. Enter distribution internal security control number-cipher key (in six segments) for use in distribution copy function.

9. Code Sequencing - The sequence of code assignment in the security message for any tabled personalization code is entered for that code and represents the recurring ten uses of that code. That is, if the ten codes are "A through J", the sequence designation could be D, E, J, A, C, G, F, I, B, and H. This sequencing control is stored in and used only by the individual electronic key 14. As noted, these steps are performed by the software vendor (manufacturer or wholesale supplier, not retailer). Once for each software system or revision of it.

At the conclusion of these steps, the personalization variables (tables) are encrypted via six master encryption keys (one for each table type) supplied by the software vendor and placed on disc. Steps can be taken to segment the personalization process among different individuals; so that once the information is encrypted and placed on the disc, no individual employee has sufficient knowledge to violate the security which has been established.

Personalization of the security message on a copy of the specific software package and in the individual electronic key 14 is accomplished by executing the application software copy supplied by the security vendor. The information produced or verified is as follows:

1. Verification of the vendor number and the uniqueness of the product serial number found in an electronic key.
2. Encoding of the electronic key 14 to include the values P, $E_I$, $E_O$, $E_K$, $S_I$, $S_O$, $S_K$, $N_I$, $N_O$, $N_K$, T, and K and their associated tables developed during the "personalization" process defined above.
3. Encoding of the electronic key 14 with abort codes which were developed during the "personalization" process defined above.
4. Encoding, nulling, transposing, and encrypting of the initial security message using the encipher key generating program.
5. Writing the initial security message to the software distribution disc.
6. Null, transpose and encrypt P, $E_I$, $E_O$, $S_I$, $S_O$, $N_I$, $N_O$, T, and K and their tables using the matter encryption keys provided by the software vendor and entered during the "personalization" process defined above.
7. Write and encrypted tables to the software disc.
8. Null, transpose, and encrypt the master encryption keys used above using the master encipher key generating program.
9. Write the encrypted master key to disc.
10. Assign the distribution internal security control number.
11. Null, transpose, and encrypt the distribution internal security control number using the distribution internal security control number cipher key entered at personalization time for this purpose.
12. Write the software distribution date (in plain text) and encrypted distribution internal security control number to disc. (The purpose of the distribution date and control number is to provide authentication of the disc copy of software when it is returned for replacement of a defective key.)
13. Copy the application software to the remaining disc or discs.
14. Encode a "personalization-complete" code in the ROM of the electronic key. The function of this code once it is encoded into the electronic key prevents access by the outside world to the "personalization" data in the key. It acts as a "lock" to this data to prevent it from being obtained electronically or programmatically from the key. Before entering into a discussion of FIGS. 3, 4, and 5, a summary of the security message and the functions which it provides is considered in order. As mentioned previously, the program itself is provided with randomly embedded error instructions which must be nulled by the proper interaction of the encrypted security message from the disc and the individual key 14 to permit correct operation of the program. Consequently, if a program is operated without nulling of the error codes the program automatically fails in a manner selected by the software vendor. The software vendor decides where the various security check points will be executed; and the number of checks at these points can be varied. A compromise must be made in the number of check points. If there are too many, the response time for the program operation is made excessively long. If too few check points are employed (2 or 3) the "hacker" is assisted in cracking the security code. It should be noted, however, that error code may be placed in programs other than those containing security check points. Once the system operation has made it past the initial sign-on where the program identification is checked with encrypted program identification in the key 14, and any variables have been passed to the master key 12 (port environment) the security target check point is established by the values $T_1$ in the security control of Encryption Level I. A count is made of the check point target occurrences in the CPU 10 in accordance with the object code of the program, as well as in a corresponding counter in the key 14. A threshold or limit comparator in the key 14 establishes the check point frequency or number of times the check point target is to be active or counted before a comparison is made. The comparison is made, as described in more detail subsequently, and then the check point target $T_1$ is changed through interaction of signals from the key 14, the CPU 10, and is stored encrypted on the software disc to establish the next check point which is to be monitored in the continual operation of the program. This is a moving target which involves an active interaction between the software program and the key 14 to prevent an attacker from locating and patching around the execution of the software security, since the occurrences $O_1$ and $O_2$ of the target $T_1$ must be equal when they are checked at the check-point test through the individual key 14 during the operation of the software. $O_1$ and $O_2$ represent a computer calculated number of occurrences of the check-point occurring at $T_1$ and the electronic key 14 theoretical calculation of the same value, respectively. It should be noted that the beginning values assigned to $O_1$ and $O_2$ need not be 01.

Should the session be ended prior to, as is usually the case, the end of a complete check-point cycle, i.e. fifteen occurrences out of thirty, resumption of sixteen will occur during the next session via the updated values $O_1$ and $O_2$ stored in the encrypted security message on disc each time security check-point is executed.

All of the data in the security message is retrieved in its fully encrypted state from the software disc and appears in its fully encrypted form through the computer 10 and the communications port 11 as this data is sent to the individual personalized key 14 in the operation of this system. The unique key identification (vendor ID of FIG. 2) constituting the number and product information travels unencrypted and forms the message destination (along with the encrypted product serial number) of the electronic key. Travelling along with this address are the encrypted message envelopes, which actually includes all of the components identified in FIG. 2 as Encryption Level I and Encryption Level II. Encryption Level I is the outer envelope of data. The inner envelope (Encryption Level II) is doubly protected from attack by the Level I encryption algorithm and encryption keys in addition to its own highly secure Level II encryption algorithm and encryption keys as it travels to and from the electronic key 14. The scramble encryption, transposition, and null codes ($E_I$, $E_O$, $S_I$, $S_O$, $N_I$, and $N_O$) are used during the Encryption Level I process and $E_K$, $S_K$, and $N_K$ constitute the encryption keys used for the decryption of the Encryption Level II process which occurs within the electronic key 14. Once the second envelope (Encryption Level II) is safely inside the electronic key 14, as transported by Encryption Level I, the decryption of Level II is effected and the process of comparing the data received through the computer 10 from the software with the corresponding uniquely encoded information of the key 14 associated with that software set is accomplished.

The information for the decisions and action taken, as interspersed in the application object code is illustrated in FIG. 3. The rectangles of FIG. 3 define action taken or to be taken in response to various decisions. The diamond-shaped boxes relate to the different decision points which are employed in the operation of the software under control of the security system. As mentioned previously in conjunction with FIG. 1, the security keys preferably are divided into two sections, namely a master key 12 and an individual electronic key 14. The master key 12 is the same for all applications of software using the system whereas the individual electronic keys 14 are uniquely encoded for operation with only a single software set or system which corresponds to the encoding of the individual key 14. Consequently, in the operation of the system, processing of the application code of the software is first interrupted at Phase I as shown in FIG. 3. The initial step is to retrieve the encrypted master keys (40). Following this, the system retrieves the encrypted table values (41) E, S, N, T, and K. The next step is to load the tables of these encrypted values (42) for operation by the security check point Phases II-V if the security check-point $T_1$ is active.

As noted in FIG. 3, this portion of the program then may be followed by a substantial part of the standard software application code before the next portion (Phase II) of the security check occurs. As mentioned previously, the different Phases I through VI of the security message program are interspersed at random intervals throughout the software program to make detection of these various phases or sections extremely difficult.

Phase II, as indicated in FIG. 3, checks to determine whether the check point target $T_1$ is active (44). If it is, the program continues; and if the communications RS-232 Port is not busy, the security message is retrieved (46) from the disc and is processed through the computer and the key 14 to provide a reply at the RS-232 Port indicating that an individual electronic key 14 has replied (47). The program variables are set to indicate a successful reply ready (48) for the next phase, phase III of the security processing. If the reply is unsuccessful, this also is indicated (49). and Each of the processing phases are shown in turn separated by the portions of the software application code in which they are embedded in FIG. 3. The decisions and action taken at each of the different steps all are indicated in FIG. 3. For Phases III and IV, these include decryption, unscramble, and null (50) of a valid reply, the making of a status security check (52); and setting the program to null program errors (54) for good security status. In addition, whatever the security status, the next outbound message is assembled (55) and encrypted (57). For a valid reply, the message then is written to disk (59).

Figure 4:
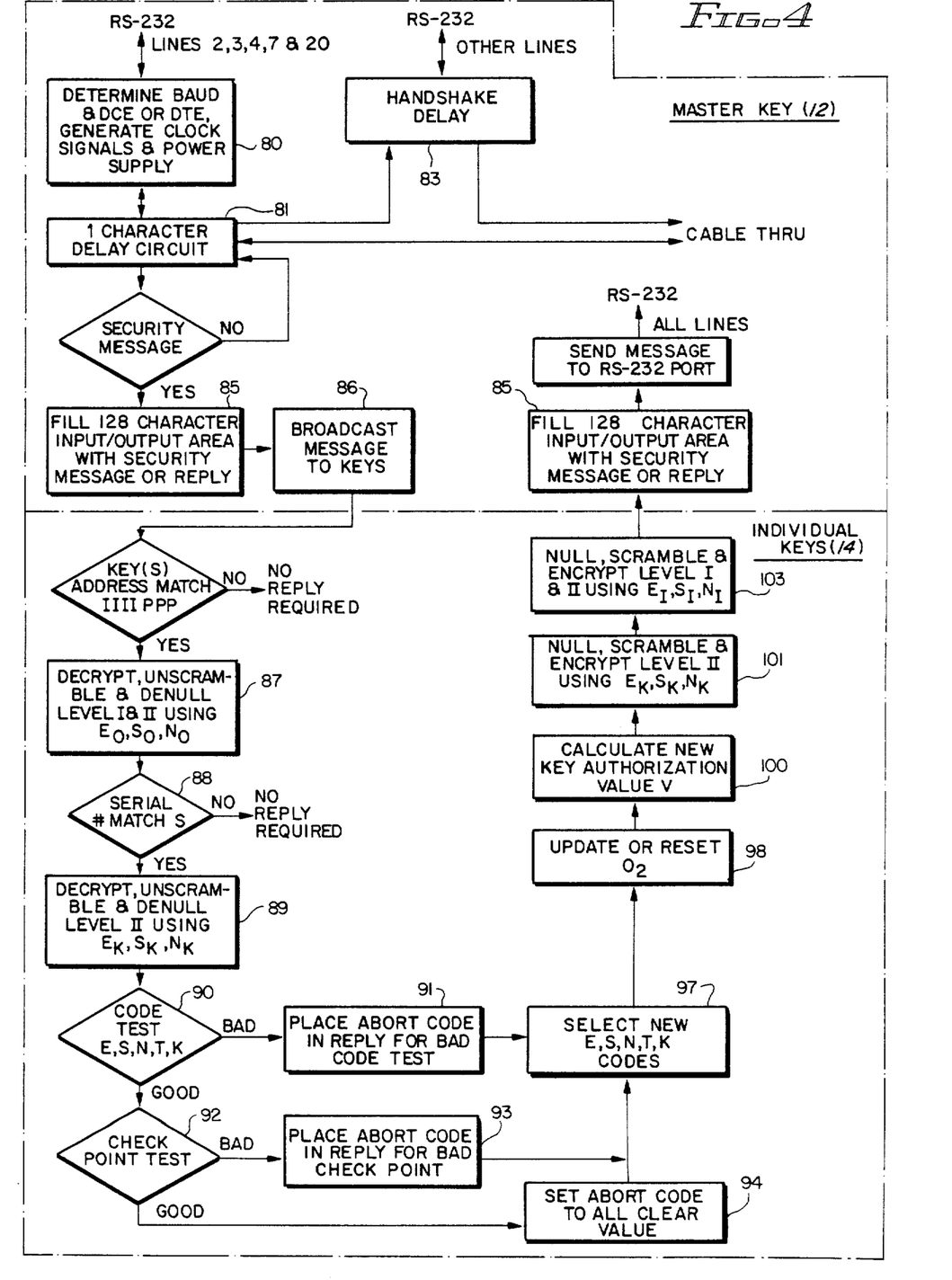
FIG. 4 is a flow chart of the electronic key operation responding to signals from the computer and supplying signals to the computer for interaction with the operating program as shown in FIG. 3.

Reference now should be made to FIG. 4 which indicates the manner in which the master key 12 and the individual key(s) 14 function in response to the operation of this program. As indicated, the master key 12 receives and continuously monitors all of the signals on the RS-232 Port 11 from the computer 10. It first is necessary for a determination to be made (for the subsequent processing of the signals) as to whether the signals are from a data terminal equipment DTE) or data communications equipment (DCE) (80). When this is done, the master key generates the necessary clock signals and includes circuitry for providing a proper power supply from the power available on the RS-232 Port 11. Signals which then are passed on by the master key 12 are placed in a one character delay circuit (81) which interconnects with a "hand shake delay (83)" for determining that a security message is present. If the message is present, it is placed in a input/output buffer (85) which then is made available to the individual electronic keys 14.

Since a single master key 12 may be used with a number of different software systems each having a different unique individual key 14, it is possible for the master key 12 to identify a security message which is not intended for a particular one of the individual electronic keys 14. All of the individual keys 14 which are associated with a single master key 12 are connected in parallel (at 86), and the first decision which is made is to determine whether or not a particular key 14 is being addressed by the security message which is present. If it is not addressed, no replay is required and some other key 14 handles the subsequent processing.

If the message, however, is directed to the individual electronic key 14, such as the one shown in FIG. 4, the first part of the address match is determined. Then the Level I portion of the security message is decrypted, detransposed or unscrambled, and denulled (87). At this point, an identification of the specific product serial number (88) for the software which is to be run with the key 14 is made. If this serial number does not match, no reply is required and further processing by the key 14 ceases. If there is a match of the serial number, however, Level II (the inner encryption envelope) decryption, detransposition or unscrambling, and denulling (89) takes place. The code test (90) of the values of E, S, N, T, and K is then made. $T_1=T_2$, $K_1=K_2$, $E_I$, $E_O$, $S_I$, $S_O$, of Plain Text equal corresponding values of Encryption Level II, and $N_I$, $N_O$ of Encryption Level I equals corresponding values of Encryption Level II. If these values for the security status code check fail, the key 14 operates to place an abort code in its reply (91) indicating a bad code test.

Figure 5:
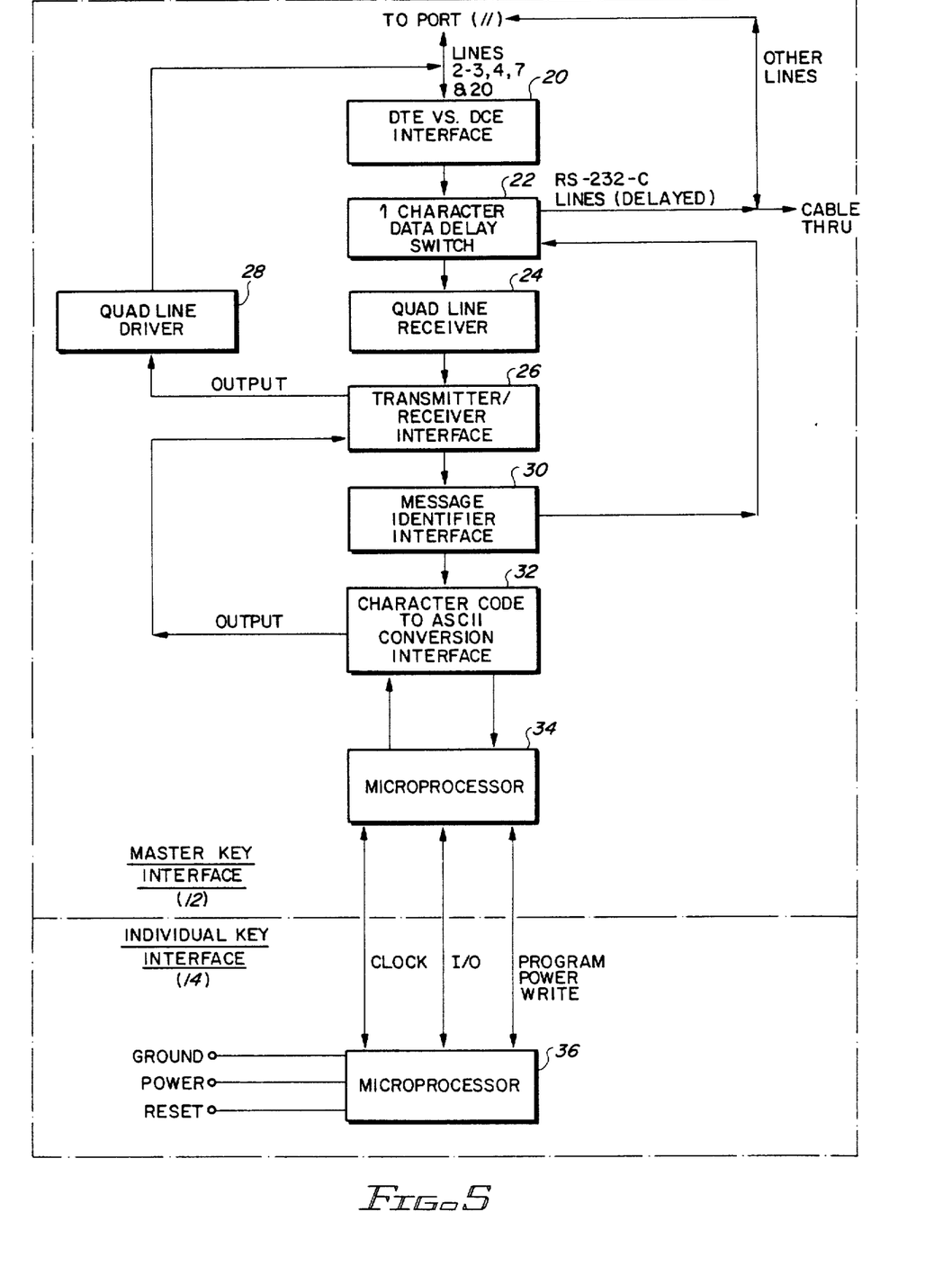
FIG. 5 is a block diagram of a portion of electronic key circuitry used in the preferred embodiment.

Reference now should be made to FIG. 5 which shows additional details of the optional port environment for master key 12. As mentioned in conjunction with FIG. 1, the master key 12 may not be used where the CPU is a ROM controlled computer. The master key 12, however, is used for those situations in which the CPU is a general purpose computer 10 used for other functions. The two-way communications link to the RS-232 Port 11 of the computer 10 is first coupled to the DTE/DCE interface 20 which determines the nature of the communications link for establishing the characteristics of signals supplied back to the port 11 on the proper pin. The output of the interface block 20 is supplied to a one character delay switch 22 which, as described above is conjunction with FIG. 4, is used to determine the presence or absence of the identification control character which precedes security messages. The output of the one character data delay switch 22 then is applied to a quad line receiver (such as the Motorola 1489) 24 which supplies the signals to a transmitter/receiver interface circuit 26. The transmitter/receiver interface circuit 26 may be of any suitable type such as the Motorola 6850, National Semiconductor 8250, Intel 8251A, or General Instrument AY-3-1813A. The interface circuit 26 passes signals from the RS-232 port on through the remainder of the master key circuit 12 to the individual key circuits 14 and also receives messages from the individual keys 14 and passes them as output signals through a quad line driver 28 (which may be the Motorola 1488 driver) to the RS-232 Port 11.

Received signals, however, then are supplied through a message identifier interface circuit 30 to a character code to ASCII conversion interface 32 which supplies the signals to a micro-processor 34 which includes the input/output buffer for determining the message length and which also provides the master and detail interface validation between the master key 12 and the individual electronic keys 14. The micro-processor 34 also functions as the "personalization" interface for the "personalization" process to establish the initial data in individual electronic keys 14 through the CPU 10 as described previously. The individual electronic keys 14 each have a microprocessor 36 which is utilized for the interchange of the data to and from the micro-processor 34 in the master key 12. This micro-processor 36 along with associated ROM memory provides the functions which are illustrated in FIG. 4 and which have been described above for the individual keys during the operation of the system.

As mentioned previously, the receipt of an abort code by the computer 10 from a key 14 causes execution of the error code in the program in a manner selected by the software vendor. As indicated in Phases V and VI of FIG. 3, the first receipt of an abort code by the computer 10 preferably causes the CRT associated with the computer 10 to display a warning message (61) to the user of the program that continued use is not possible and the program will lock-up and not allow further operation. This warning message is employed to protect authorized users of the program who may have forgotten to insert their key to unlock the program, to signal a wrong key insertion, or a malfunction of the security hardware. If such a user is provided with this warning message, insertion of the key 14 at this point will permit reoperation of the steps mentioned up to now to provide a proper unlocking of the program without destroying any data which the authorized user may be operating upon with the program. If the user is unauthorized, continued use of the program, however, by patching around the halt, without a key 14 or without the correct unique key 14, will result in the status of a Phase VI of FIG. 3 occurring; and the program will operate by executing the builtin error code (63). This is the intended purpose of the system whenever an unauthorized use occurs.

Referring now again to FIG. 4, if all of the check point tests (90) and code tests (92) are valid or good, the abort code is cleared (94), and new values of E, S, N, T, and K codes are selected (97) (if bad, an abort code is placed in the reply 93). The count of the check-point test is updated or reset to give a new value to the count $O_2$ (98) and a new key authorization value $V_1$ (the four position code of FIG. 2) (100) is calculated in accordance with an algorithm and mask in the electronic key 14. This is accomplished through the operation of the key authentication code table $K_1$ or $K_2$ indexing one of ten possible key authentication values each of which in turn are comprised of a four position numeric value with the range of 1,000 to 9,999 and an eight position mask made up of four blank positions interspersed with four non-recurring alphanumeric characters such that when it is used with an eight digit numeric value, a four digit numeric value can be deduced by eliminating the digits whose relative positions in the mask are blank. The calculation of the new value of $V_1$ is made in accordance with the formula $Mo(V_0+K_1)^2=V_1$, where $M$=mask value indexed by $K_1$; $V_0$=original $V_1$ sent to the electronic key as $V_1$, and $V_1$=the returned electronic key result. This new value $V_1$ then is supplied to the CPU on the RS-232 port and is compared to an equivalent value calculated by the CPU and then is passed by the CPU (in encrypted form 101, 103 as established by the electronic key 14) to be stored on the disc as the next value of $V_1$ for subsequent calculations.

If an attempt is made to program around any of the various phases of the security message system or to build a look alike key, failure of either the comparison of the target count $O_1$ with $O_2$ or failure of the comparisons of the key authentication value characters $V_1$ will eventually occur at sometime during a session. The results will be execution of the built-in errors (Phase VI, FIG. 3) in the program, causing improper calculated application results.

63, It should be noted that the error code (Phase VI, FIG. 3) which is built-in to the programs may be inserted into operating programs other than those which have the embedded security check phases. As a consequence, it is extremely difficult for an unauthorized user to locate the errors and to null them without a complete reverse engineering and rewriting of all of the working programs within any particular software package.

The system is designed to prevent unauthorized use of the security protected program by either passive or active intruders. Passive intruders include those who monitor security messages (such as appear on data buses) and then decipher the messages in order to discover variables related to security checking. Since the only places in the computer where signals can be monitored all carry encrypted security message signals, it is extremely difficult for a passive intruder to decipher those messages.

Active intruders include "hackers" who are actually creating data and sending or modifying security messages from a computer to the keys 12 and 14 in an effort to break encryption. It is possible that an active intruder could break Level I encryption. Since "Plain Text", Level I, and Level II table codes ($E_I$, $E_O$, $S_I$, $S_O$, $N_I$, $N_O$, $E_K$, $S_K$, and $N_K$) are checked at the quasirandomly located check-point locations (code test), if an active intruder has broken Encryption Level I, the comparison of "Plain Text" and Encryption Level I to Encryption Level II will probably fail. Under normal circumstances, where the system is operating with an authorized electronic key 14, "Plain Text" and Encryption Level I to Encryption Level II codes always correspond to one another. The information in Encryption Level II can be decrypted only with the encryption keys located within the electronic key 14. A code for activating this key to in turn decrypt the information in Level II travels with the Level I portion of the security message for use with the reference table for encryption keys located within the electronic key 14. The table and the encryption keys never travel outside the electronic personalized key 14 so that the Level II encryption keys are wholely unaccessible to intruders, whether they are passive or active.

It also should be noted, that the electronic key 14 is manufactured in such a way that an attempt to physically dismantle the key in an effort to probe the microprocessor and ROM memories located within it destroys the circuit interconnections so that breaking of security in this manner is made impossible. Electronic monitoring by means of probes and oscilloscopes also results in meaningless information since the information travelling into and out of the key comprises the encrypted envelopes of Encryption Level I and doubly Encrypted Level II outside of the small amount of plain text information indicated in FIG. 2. FIG. 5 illustrates, in block diagram form, specific hardware components which constitute the interface of the master key 12 with the computer and the input interface of the individual electronic key 14. Each of these blocks are identified with the function provided and constitute an electronic flow chart for the data transfer to and from the computer 10.

It should be noted in conjunction with the foregoing description that the system does not operate to prevent the copying of the application software. On the contrary, copying of the software for archival or back-up purposes of to permit an authorized user to have copies of the software at multiple locations is encouraged. The software can be operated only when it is operated in conjunction with the single individual electronic key 14 which is associated with it. This key unlocks the software and permits it to run in any computer which is configured to handle that particular software package. Consequently, a user could have one copy of the software at home and another copy at the office. A unique electronic key, however, would be necessary to operate either of the software copies so that the user would need to carry the electronic key from one location to another to operate the software on computers located in those two different locations. The system is easy to use since is easily is plugged into the RS-232 Communications Port found on all existing personal computer hardware. For the software developer the varying, active security checks on the computer side coupled with the polyalphabetic encryption and decryption code coupled with a key same length as plain text such that no unencrypted security data appears on a data bus or any available pins, results in a nearly fully secure system for the prevention of unauthorized software use. A single standard security system can be used for all software development irrespective of the portability of the software itself.

Although the foregoing description and the system illustrated in the drawings are considered to constitute the preferred embodiment of the invention, various changes and modifications will occur to those skilled in the art without departing from the true scope of the invention. The security message format for example can be varied without departing from the scope of the invention and various types of encryption and security checking techniques may be employed while realizing the benefits of the invention.

I claim:

1. A system for insuring operation of a computer controlled function, only in the presence of an authorized key in which such operation is protected by encrypted security message portions having a moving target portion, and where the function control includes pre-set errors therein to cause erroneous operation of the function unless said errors are nulled during execution of the function control by said computer, said computer having a communications port and said system including in combination:

at least one security key means responsive to a unique key indentification code for connection to the communications port of said computer and including decryption circuit means therein uniquely encoded for decrypting said security message portions;

means for connecting said key means to the communications port of said computer for transferring said identification code and signals including said encrypted security message portions from said computer to said key means and for transferring signals from said key means to said computer;

circuit means in said key means enabled by said identification code for recognizing predetermined ones of said security message portions and, in response to such recognition, for modifying such predetermined ones of said message portions supplied to said key means from said computer and for reencrypting such modified message portions and supplying such reencrypted modified portions from said key means back to said computer for comparison and verification with computer generated modified message portions of said same predetermined ones of said message portions to cause said computer to store said modified security message portions outside said key means as replacements for previously stored such predetermined ones of said security message portions for use by said computer and said key means in a later cycle of operation;

said key means having a target detecting means and counter means therein for producing a count each time said moving target portion is detected by said key means in signals supplied from said computer to said key means; said count being encrypted by said key means and stored outside said key means by said computer; and said key means includes means responsive to a predetermined count in said counter for initiating a comparison of the count in said key means and the count stored outside said key means whereupon failure of said comparison causes said erroneous operation to occur; and null signal producing means coupled with said recognizing means in said key means for generating null signals supplied through said connecting means to said computer for nulling said pre-set errors during operation thereof.

2. The combination according to claim 1 wherein the communications port of said computer supplies operating power to said key means as well as passing signals between said key means and said computer.

3. The combination according to claim 2 where the sole power supply for said key means comprises the power present on the communications port of said computer.

4. The combination according to claim 3 wherein the communications port of said computer to which said key means is attached is an RS-232 Port.

5. The combination according to claim 4 wherein said modified predetermined ones of said security message portions stored outside said key means is supplied through said computer to said key means for establishing and setting initial operating parameters in said key means each time operation of said program is re-initiated following a time of non-use.

6. The combination according to claim 5 wherein said key means further includes circuit means responsive to failure of said key means to receive and decrypt said predetermined ones of said security message portions for producing a warning signal, whereupon said warning signal is supplied from said key means to said computer for utilization thereby to cause erroneous operation of said function.

7. The combination according to claim 6 wherein a plurality of key means may be connected in parallel to said computer by said means for connecting said key means thereto to facilitate operation of different functions by said computer.

8. The combination according to claim 1 wherein said modified predetermined ones of said security message portions stored outside said key means is supplied through said computer to said key means for establishing and setting initial operating parameters in said key means each time operation of said program is re-initiated following a time of non-use.

9. The combination according to claim 1 wherein a plurality of key means may be releasably connected in parallel to the communications port of said computer by said means for connecting said key means thereto for use with operation of different functions, corresponding to each of said key means, by said computer.

10. A system for insuring operation of a computer software program by only an authorized user in which such software program includes encrypted security message portions inserted therein and where said program also includes pre-set errors therein to cause erroneous operation thereof unless said errors are nulled during operation of said program, said computer having a communications port and having at least one disc drive and said software program is at least in part stored on a disc in such disc drive, and said security message portion included in said software futher includes a moving target portion, said system including in combination:

at least one security key means responsive to a unique key indentification mode for releasable connection to the communications port of said computer and including decryption circuit means therein uniquely encoded for decrypting said security message portions of said software;

means for releasably connecting said key means to the communications port of said computer operating said software for transferring said identification code and data signals and said encrypted security message portions from said computer to said key means and for transferring signals from said key means to said computer;

circuit means in said key means enabled by said identification code for recognizing predetermined ones of said security message portions and, in response to such recognition, for modifying such predetermined ones of said message portions supplied to said key means from said computer and for reencrypting such modified message portions and supplying such reencrypted modified portions from said key means back to said computer for comparison and verification with computer generated modified message portions of said same predetermined ones of said message portions to cause said computer to store said modified security message portions in said software as replacements for previously stored such predetermined ones of said security message portions for use by said computer and said key means in a later cycle of operation;

said key means having a target detecting means and counter means therein for producing a count each time said moving target portion is detected by said key means in signals supplied from said computer operating said software to said key means; said count being encrypted by said key means and stored in encrypted form in said software on a software disc in the disc drive by said computer, and said key means including means responsive to a predetermined count in said counter for initiating a comparison of the count in said key means and the stored count, whereupon failure of agreement of said stored count and said key means generated count causes erroneous operation of said program; and null signal producing means coupled with said recognizing means in said key means for generating null signals supplied through said connecting means to said computer for nulling said pre-set errors in said program during operation thereof, said pre-set errors included in said program causing said erroneous operation of said program to occur upon failure of said computer to receive null signals from said key means at predetermined times.

11. The combination according to claim 10 wherein the communications port of said computer supplies operating power to said key means as well as passing signals between said key means and said computer.

12. The combination according to claim 11 where the sole power supply for said key means comprises the power present on the communications port of said computer.

13. The combination according to claim 12 wherein the communications port of said computer to which said key means is attached is the RS-232 Port.

14. The combination according to claim 13 wherein said modified predetermined one of security message portion stored in said software is supplied through said computer to said key means for establishing and setting initial operating parameters in said key means each time operation of said program is re-initiated following a time of non-use.

15. The combination according to claim 14 wherein said key means further includes circuit means responsive to failure of said key means to receive and decrypt said predetermined ones of said security message portions for producing a warning signal, whereupon said warning signal is supplied from said key means to said computer to produce a warning display to alert users of the system that the program is about to be erroneously operated prior to actual erroneous operation of said program, 16. The combination according to claim 10 wherein said modified predetermined one of security message portion stored in said software is supplied through said computer to said key means for establishing and setting initial operating parameters in said key means each time operation of said program is re-initiated following a time of non-use.

17. The combination according to claim 10 wherein said key means further includes circuit means responsive to failure of said key means to receive and decrypt said predetermined ones of said security message portions for producing a warning signal, whereupon said warning signal is supplied from said key means to said computer to produce a warning display to alert users of the system that the program is about to be erroneously operated prior to actual erroneous operation of said program.

18. A system for insuring operation of a computer software program by only an authorized user in which such software program has a moving target portion and includes encrypted security message portions inserted therein and where said program also includes pre-set errors therein to cause erroneous operation thereof unless said errors are nulled during operation of said program, said computer having a communications port and said system including in combination:

at least one security key means responsive to a unique key indentification code for releasable connection to the communications port of said computer and including decryption circuit means therein uniquely encoded for decrypting said security message portions of said software;

means for releasably connecting said key means to the communications port of said computer operating said software for transferring said identification code and data signals and said encrypted security message portions from said computer to said key means and for transferring signals from said key means to said computer;

circuit means in said key means enabled by said identification code for recognizing predetermined ones of said security message portions and, in response to such recognition, for modifying such predetermined ones of said message portions supplied to said key means from said computer and for reencrypting such modified message portions and supplying such reencrypted modified portions from said key means back to said computer for comparison and verification with computer generated modified message portions of said same predetermined ones of said message portions to cause said computer to store said modified security message portions in said software as replacements for previously stored such predetermined ones of said security message portions for use by said computer and said key means in a later cycle of operation;

said key means having a target detecting means and counter means therein for producing a count each time said moving target portion is detected by said key means in signals supplied from said computer operating said software to said key means; said count being encrypted by said key means and stored in encrypted form in said software by said computer, and said key means including means responsive to a predetermined count in said counter for initiating a comparison of the count in said key means and the stored count, whereupon failure of agreement of said stored count and said key means generated count causes erroneous operation of said program; and null signal producing means coupled with said recognizing means in said key means for generating null signals supplied through said connecting means to said computer for nulling said pre-set errors in said program during operation thereof.

19. The combination according to claim 18 wherein a plurality of key means is connected in parallel to said computer by said means for connecting said key means thereto to facilitate operation of different functions by said computer.

* * * * *